United States Patent [19]
Wilhelmson et al.

[11] Patent Number: 4,560,101
[45] Date of Patent: Dec. 24, 1985

[54] SELF-LOCKING, REMOVEABLE TAPERED TIPS FOR SOLDERING AND DE-SOLDERING TOOLS

[75] Inventors: Jack L. Wilhelmson; Paul L. Urban, both of Cheraw, S.C.

[73] Assignee: Cooper Industries, Inc., Houston, Tex.

[21] Appl. No.: 504,970

[22] Filed: Jun. 16, 1983

[51] Int. Cl.⁴ .............................................. B23K 3/02
[52] U.S. Cl. ........................................ 228/54; 228/59
[58] Field of Search ............................ 228/54, 55, 59; 279/103

[56] References Cited

U.S. PATENT DOCUMENTS

| | | | |
|---|---|---|---|
| 2,418,781 | 4/1947 | Lewis | 279/103 X |
| 2,763,762 | 9/1956 | Jepson | |
| 3,120,598 | 2/1964 | Westerback et al. | |
| 3,358,897 | 12/1967 | Christensen | |
| 3,646,577 | 2/1972 | Ernst | |
| 4,187,972 | 2/1980 | Vella | 228/54 X |
| 4,424,930 | 1/1984 | Wilhelmson | 228/54 X |

FOREIGN PATENT DOCUMENTS 875667 6/1942 France ............................... 228/55

Primary Examiner—Kenneth J. Ramsey
Attorney, Agent, or Firm—Finnegan, Henderson, Farabow, Garrett & Dunner

[57] ABSTRACT

A soldering or de-soldering tool with self-locking, removeable soldering or de-soldering tapered tips which interlock with a similar taper in a tip-receiving bore of the tool. The invention also is directed to a replaceable soldering or de-soldering tip using only a self-locking taper to provide attachment, sealing and heat transfer. The tips may be made of conventional materials, such as copper, or can be carbon-based. In the preferred embodiment of the invention the tips are carbon-based, and the attachment portion of the tip which fits within the tip-receiving bore of the tool is unplated.

19 Claims, 11 Drawing Figures

U.S. Patent  Dec. 24, 1985  Sheet 1 of 4  4,560,101

SELF-LOCKING, REMOVEABLE TAPERED TIPS FOR SOLDERING AND DE-SOLDERING TOOLS

BACKGROUND OF THE INVENTION

1. Field of the Invention

The present invention relates to self-locking, removable solder or de-soldering tapered tips for soldering and de-soldering tools. The tips interlock with similar tapers in a tip-receiving bore of the tool. The tips may be made of conventional materials, such as copper, or can be carbon-based. Often the tips include plated soldering surfaces. More particularly, the invention is directed to replaceable soldering and de-soldering tips which are less expensive than standard threaded or slip fit tips, are more easily attached to and removed from the tool, provide a good vacuum seal for de-soldering, and provide improved heat transfer characteristics. The tips are preferably resistant to both high temperatures and corrosion and can be used with all types of soldering and de-soldering tools, including temperatures-controlled soldering irons and de-soldering tools.

2. Description of the Prior Art

It is well-known that all soldering irons have soldering tips, and the majority of soldering irons are adapted to receive replaceable soldering tips. Replaceable tips are normally inserted into a tip-receiving bore of a soldering iron and are threaded or fixed in place by a set screw or similar mechanical device. The most common tips are either threaded tips or slip fit tips held in place by nuts or screws.

It is further known that many temperature-controlled soldering irons include a sensor element extending within the iron's tip-receiving bore. The sensor element fits within a portion of a permanent or replaceable soldering tip. It is also well-known that de-soldering tools have replaceable de-soldering tips which are normally screw-threaded to the tool. These tips include a central tubular vacuum passage through which the melted solder is drawn.

Conventional threaded tips and slip fit tips do not permit the most effective heat transfer between the tips and soldering irons or de-soldering tools. Both of these conventional tips and these attachment methods fail to provide the most desirable heat-transfer interface between the tips and the soldering iron or de-soldering tool.

The conventional means of attaching and removing soldering and de-soldering tips from the tool are both expensive and time consuming. The threading of the threaded tips and the tip-receiving bore of the tool adds an additional manufacturing cost to the tool and tip. Similarly, conventional slip fit tips require an additional mechanical feature, such as a lock bolt or set screw, to fix the tip in place. Again, these mechanical features require additional machinery operations and parts. In addition, the removal and replacement of these conventional tips is time consuming because of the need to loosen and retighten the mechanical locking features.

Because of the miniaturization presently occurring in the electronics field, soldering and de-soldering tips in many applications have decreased substantially in size to permit precise soldering. The demand for smaller soldering tips increases the expense and problems associated with threaded or slip fit soldering and de-soldering tips and aggravates the problems associated with heat transfer and sealing of threaded and slip fit tips.

SUMMARY OF THE INVENTION

It is therefore an object of the present invention to provide replaceable soldering and de-soldering tips which can easily be fixed to and removed from the respective tool without the need for threaded or mechanical connections. It is a further object to provide such soldering and de-soldering tools and tips which are less expensive to manufacture, are more economical to use, and provide better heat transfer and sealing at the interface of the tip and respective tool.

It is also an object of the present invention to provide a soldering or de-soldering tip which can, without binding, be sized to snugly fit within the tip-receiving bore of a soldering iron and which can snugly accept a temperature sensor of a temperature-controlled soldering iron. Another object is to provide a de-soldering tip which provides a near perfect vacuum seal between the tip and the de-soldering tool.

Additional objects and advantages of the invention will be set forth in part in the description which follows and in part will be obvious from the description, or may be learned by practice of the invention. The objects and advantages of the invention are realized and obtained by means of the elements and combinations particularly pointed out in the appended claims.

To achieve the objects and in accordance with the purpose of the invention, as embodied and broadly described herein, the invention comprises a soldering or de-soldering tool having a handle, a heating element, an operating end, and a replaceable soldering or de-soldering tip which has an attachment portion for attachment to the operating end of the tool and a soldering or de-soldering portion, the improvement comprising a tapered tip-receiving bore formed in the operating end of the tool for accepting the replaceable tip, and a tapered attachment portion of the tip sized to fit snugly within the tapered tip-receiving bore and securedly fix the tip to the tool by only the manual pressing of the tip into the tip-receiving bore, the tip being loosened by the rotation of the tip with respect to the tip-receiving bore.

The invention further comprises a replaceable soldering or de-soldering tip for a soldering or de-soldering tool with a tip-receiving bore at its operating end comprising an attachment portion for attachment to the operating end of the tool and a soldering or de-soldering portion, the attachment portion being tapered and sized to fit within a tapered tip-receiving bore of the tool and securedly fix the tip to the tool by only manual pressing of the tip into the tapered tip-receiving bore, said tip being loosened by the rotation of the tip with respect to the tip-receiving bore.

The tip-receiving bore and the tapered attachment portion of the tip are preferably frusto-conical in shape and are tapered at an angle of approximately 3.0 degrees. It is further preferable that the tip include two opposed flat surfaces for accepting a tool to rotate the tip.

It is to be understood that both the foregoing general description and the following detailed description are exemplary and explanatory only and are not restrictive of the invention, as claimed.

The accompanying drawings, which are incorporated in and constitute a part of the specification, illustrate an example of a preferred embodiment of the invention and together with the description serve to explain the principles of the invention.

DETAILED DESCRIPTION OF THE INVENTION

Reference will now be made in detail to the present preferred embodiments of the invention, examples of which are illustrated in the accompanying drawings.

Figure 1:
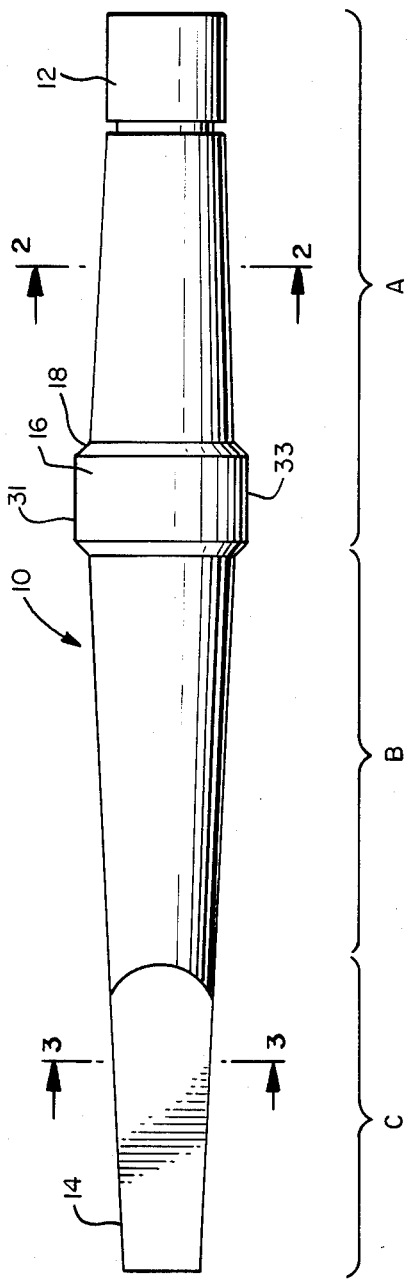
FIG. 1 is a side view illustrating one embodiment of the invention.

FIG. 1 is a side illustration of one embodiment of a soldering tip made according to the present invention. The soldering iron tip shown in FIG. 1 and designated generally as numeral 10 includes a shank or attachment portion A, an intermediate portion B adjoining the attachment portion, and a solder-wetting portion C adjoining the intermediate portion. The shank or attachment portion A is tapered and frusto-conical in shape and has a length of at least 10% of the total length of the tip. In the preferred embodiment the attachment portion has a length of at least 25% of the total length of the tip.

Figure 8:
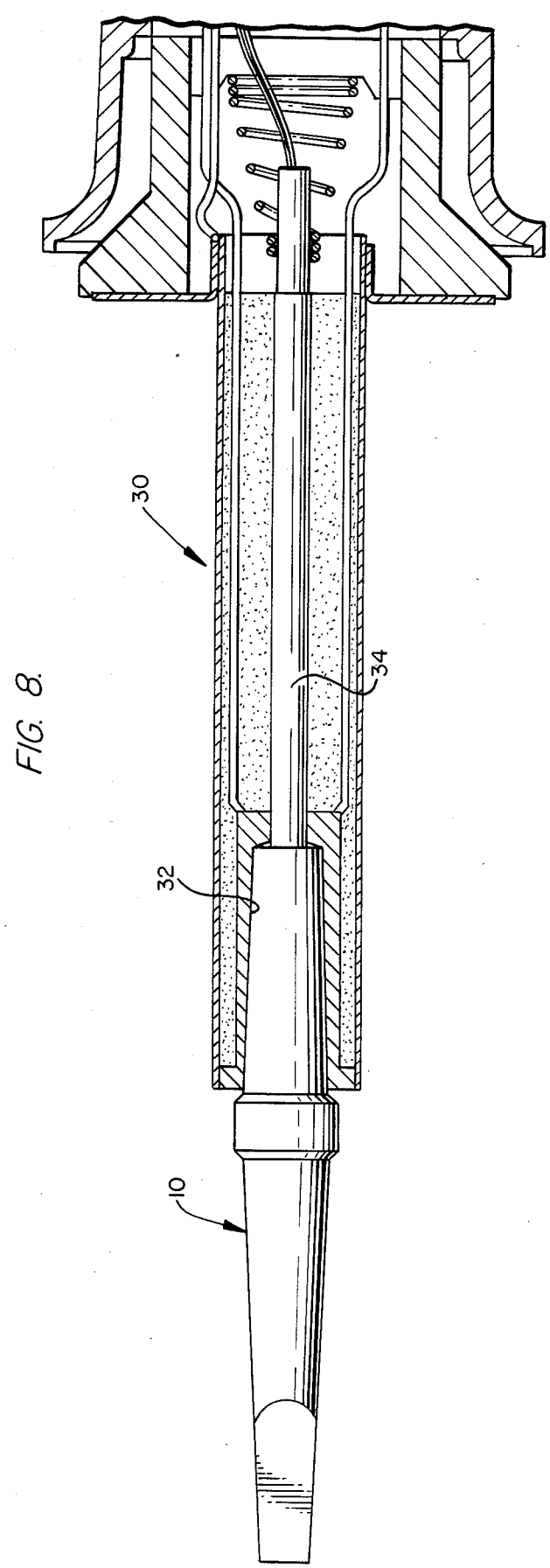
FIG. 8 is a side view showing an embodiment of the invention fixed in a temperature-controlled electric soldering iron.

In use, the shank or attachment portion A is inserted into a tip-receiving bore 32 in the heating element of a soldering iron, as shown generally in FIG. 8. The tip-receiving bore 32 is also tapered and frusto-conical in shape, and the tip is sized to fit snugly within the tip-receiving bore. Both the tip and the tip-receiving bore are tapered at the same angle and are essentially identical in size so that the pressing of the tip into the tip-receiving bore will serve to fix the tip in place without the need of an additional mechanical feature such as a threaded bolt or screw. When pressed into the tip-receiving bore, the tip snugly fits within the bore, thereby providing a strong mechanical bond, a good heat transfer interface, and a strong seal.

An angle of inclination of approximately 3.0 degrees (plus or minus 0.5 degrees) has provided the desired self-locking effect, but it can be shown that a wide range of angles will provide the effect, depending in part upon the materials of the tip and tool and the length of the tip and tip-receiving bore. The scope of the invention covers all replaceable tapered soldering or de-soldering tips which can be fixed to a tool with a matching tapered bore of a tool without additional mechanical features.

The combination of a tapered tip and a matching tapered tip-receiving bore provides good sealing, a strong joint, and very high heat transfer.

The working end or barrel of the soldering or de-soldering tool can be made from a wide variety of materials, including steel, bronze, brass, aluminum-bronze, and carbon. In the preferred embodiment the barrel is made from stainless steel which has good heat conductivity and is resistant to oxidation. Both copper-based and carbon-based tapered tips will lock into the tapered-bore formed in the above materials.

As is well recognized, the barrel of a soldering or de-soldering tool and the respective tip of those tools will expand as the tool and tips are heated and will contract as they cool. Because the barrel of the tool and the tips are often made from different materials, the barrel and the tip may expand and contract to different degrees. By means of example only, the co-efficient of heat expansion of stainless steel is $10.1 \times 10^{-6}$ inches/inch per degree Centigrade, of different forms of carbon is between 2.4 to $5.0 \times 10^{-6}$ inches/inch per degree Centigrade, and of copper is $17.1 \times 10^{-6}$ inches/inch per degree Centigrade.

Because of the relatively small size of conventional soldering and de-soldering tips and their respective tip-receiving bores, these differences in the coefficients of heat expansion do not adversely affect the locking, heat transferring, and sealing aspects of the tip and tool under normal operating conditions. For example, the inventors have found that both copper and carbon-based tapered tips work well with tools having stainless steel barrels. However, the differences in the coefficients of heat expansion can be used to an advantage. For example, if the tips of a certain tool exhibit any tendency to loosen when the tool and tip are heated, the tool and tip can be fashioned so that the attachment portion of the tip has a higher heat expansion coefficient than that of the heater barrel of the tool where the tip-receiving bore is formed. With that combination, the joint between the tip and tool increases in strength as the tip is heated. On the other hand, if it becomes difficult to remove a tip from the barrel for a particular tip and tool arrangement or design, the tip and tool can be designed so that the attachment portion of the tip has a lower coefficient of heat expansion than that of the heater barrel. The tip can then be more easily removed when the tool and tip are heated. In a similar manner, the attachment portion of the tip can be coated with different materials to provide the desired heat expansion and contraction effect.

The soldering tip 10 may include a ferrite iron heat sensing element or "magnestat" 12 fixed to the distal end of the attachment portion A. When the soldering tip 10 is inserted in a soldering iron, the magnestat contacts with a temperature sensing device in the soldering iron. The attachment portion A is preferentially frusto-conical in shape, and the tip 10 tapers generally along the intermediate portion B and the solder-wetting portion C. The working end 14 of the tip 10 can be formed in a shape most beneficial to the particular application for which the tip is designed. If desired, the tip can include a shoulder 16 with bevel edges 18. This shoulder serves as a barrier to stop any possible upward flow of solder from the solder-wetting portion C toward the attachment portion A.

Figure 2:
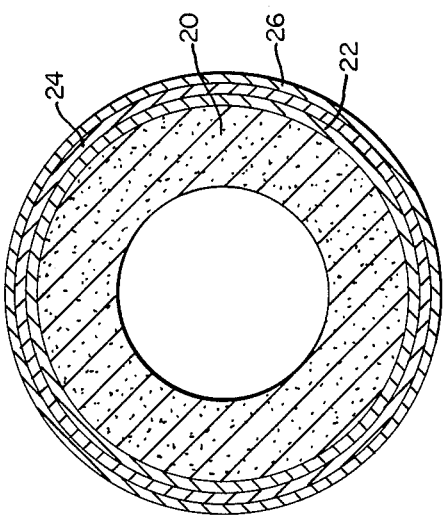
FIG. 2 is an enlarged cross-sectional view taken along lines 2—2 of FIG. 1.

As shown by the cross-section view of FIG. 2, the soldering tip has an integral body 20. The body of the tip can be made from a wide variety of materials, including the conventional copper body. Preferably, however, the tip has an integral carbon body made, for example, from pure carbon, carbon graphite or pyrolytic carbon. Each of these materials have a high carbon content. The applicant has found that each of these above carbon-based materials provides an acceptable soldering or de-soldering tip base with sufficient heat conductivity. It is believed that other carbon-based materials, in which the predominant element is carbon, may be likewise acceptable.

The thermal conductivity of the carbon materials, as well as the costs, varies from material to material. Presently, applicant considers carbon graphite to be the preferred carbon body material for most commercial applications. Carbon graphite has sufficient heat conductivity and is low in cost. Carbon graphite has a thermal conductivity which approximates 60% of the normal thermal conductivity of pure copper and costs ⅛ to 1/5 as much. In special applications, other carbon-based materials may be more appropriate. For example, if increased heat conductivity is desired, pyrolytic carbon can be fashioned to provide a much better thermal conductivity than copper. The cost of pyrolytic carbon, however, is 3-5 times as much as copper.

A carbon base provides several advantages over copper and other known base materials for soldering and de-soldering tips. If the attachment portion of the tip is left unplated, the heat transfer between the tip and the tool is increased because iron plating added to conventional tips is less heat conductive than carbon. An unplated attachment portion of a carbon-based tip overcomes this problem. Another advantage of a carbon-based tip is that the tapered shank of bare carbon-based material is soft enough that, if the fit between the tip and tip-receiving bore is not perfect, it can be corrected by rotating the tip in the tip-receiving bore several times, thereby removing a small amount of carbon and conforming the shape of the tip to the individual tip-receiving bore.

Carbon based tips provide further advantages. For example, if the tip does become bound in the tip-receiving bore, the carbon tip can be easily removed by breaking it and reaming the remains out of the tip-receiving bore with a hand reamer, pocket knife or similar tool. In addition, carbon does not dissolve when placed in contact with solders. Furthermore, the carbon does not oxidize or react with other elements at high temperatures and does not have a liquid state. Moreover, carbon materials are easily fabricated on standard machine tools, often at lesser costs than copper. Finally, as will be explained below, the carbon base readily accepts platings of metals during a plating process.

Figure 3:
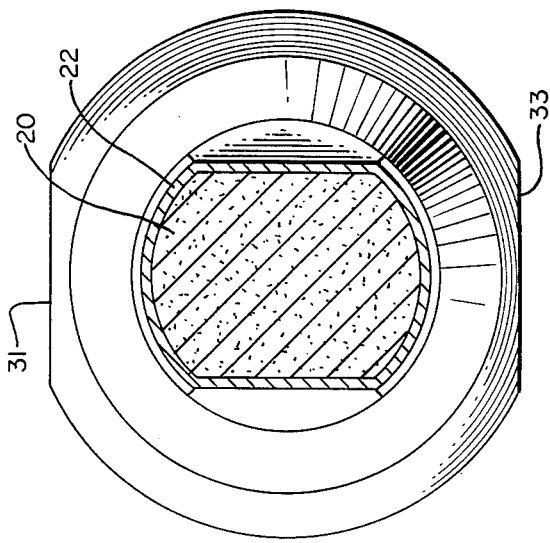
FIG. 3 is an enlarged cross-sectional view taken along lines 3—3 of FIG. 1.

In the embodiment shown in FIGS. 1, 2, and 3, the copper or carbon soldering tip includes a coating of iron 22 formed over the entire exterior body of the tip. A coating of nickel plating 24 is formed over the iron coating 22 along the intermediate portion B and the attachment portion A, but not along the solder-wetting portion C. Finally, a coating 26 of chromium is formed over the nickel plating 24 along the intermediate portion B and the attachment portion A, but not along the solder-wetting portion C.

The iron coating 22 provides a wettable surface in the working area 14 of the tip. The nickel-chrome coating localizes the wettable working surface so that precision soldering can be achieved. The nickel-chrome coating also impedes the upward flow of solder along the intermediate portion B and toward the attachment portion A. Without the coating, solder would flow to the point where the soldering tip and soldering iron meet and might bond the tip and iron together.

In the embodiment shown in FIG. 1, the attachment portion includes the exterior coatings of iron, nickel and chrome. As will be discussed below, it is possible to strip some or all coatings from the attachment portion A so that only nickle coated or uncoated, bare copper or carbon-based material interfaces with the soldering iron.

Figure 4:
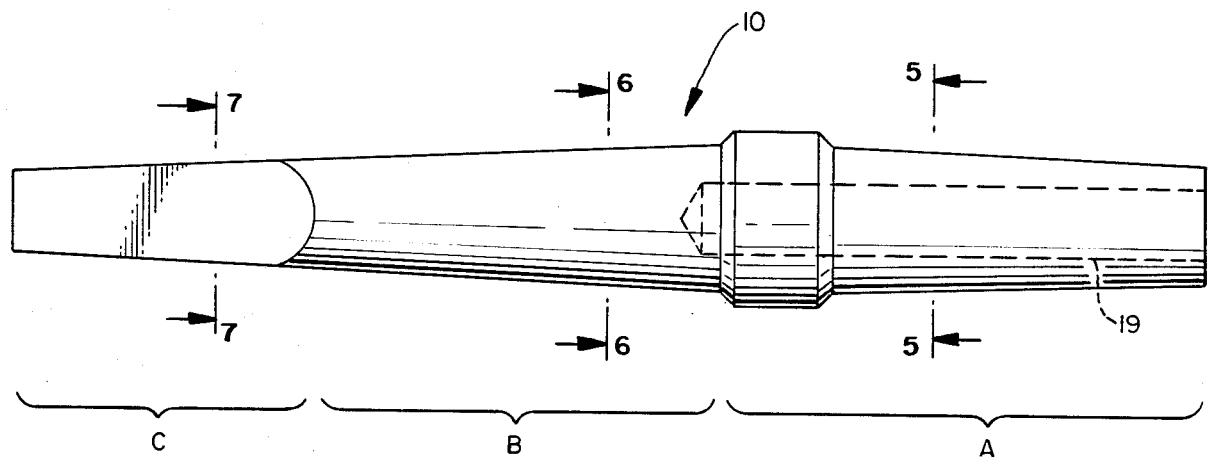
FIG. 4 is a side view illustrating a second preferred embodiment of the invention.
Figure 5:
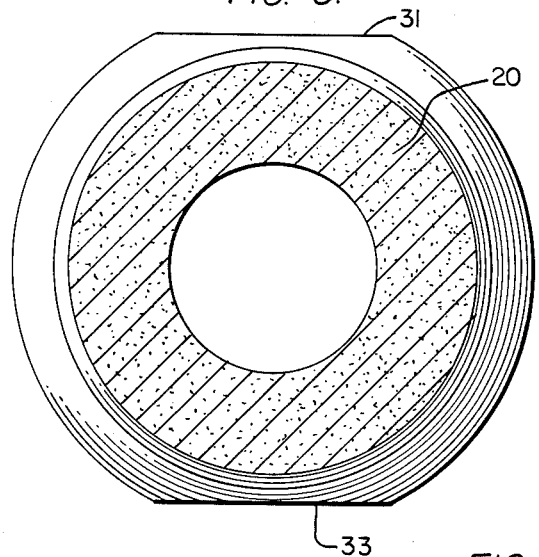
FIG. 5 is an enlarged cross-sectional view taken along the lines 5—5 of FIG. 4.
Figure 6:
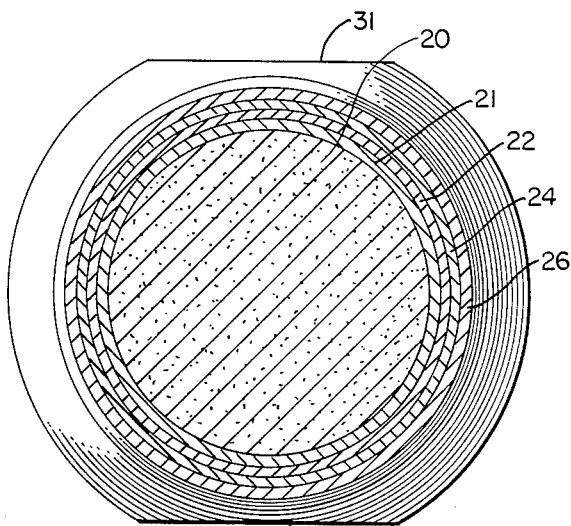
FIG. 6 is an enlarged cross-sectional view taken along the lines 6—6 of FIG. 4.
Figure 7:
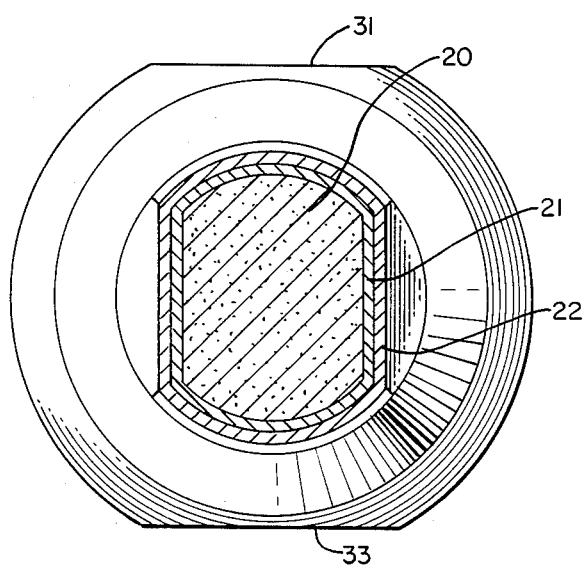
FIG. 7 is an enlarged cross-sectional view taken along the lines 7—7 of FIG. 4.

A second embodiment of a soldering tip made according to the invention is shown in FIGS. 4, 5, 6, and 7, wherein like numbers are used to refer to like parts. The soldering tip 10 shown in FIG. 4 includes an elongated bore 19 formed in the attachment portion A and sized to receive snugly a temperature-sensing element of a soldering iron. The soldering tip in FIG. 4 is similar to the tip in FIG. 1 and includes a copper or carbon body 20, an iron coating 22, a nickel coating 24, and a chrome coating 26. The attachment portion A of the tip is tapered and sized to securely fit the tip to the tool by only the manual pressing of the tip into a similarly sized tip-receiving base of the tool. In addition, the tip includes a thin coating of dull nickel 21 formed between the body 20 and the iron coating 22 along the intermediate portion B and the solder-wetting portion C. The primary distinction between the embodiment shown in FIGS. 1 and 4 is that the attachment portion A does not include any metal coatings in the finished product. Furthermore, there is no coating on the inner surface of the elongated bore 19.

The above described embodiment, when used with a carbon base, is the present preferred embodiment of the soldering tip made in accordance with the invention. It prevents any possible oxidation or freezing of the attachment portion A to the soldering iron or to the temperature-sensing element of the soldering iron. In addition, it provides the best heat-transfer between the tip and the tool and can be rotated in the tip-receiving bore to improve the fit by slightly wearing away any imperfect surfaces.

In the preferred embodiment, the coating of iron has a thickness in the range of 2 to 10 mils, the outer coating of nickel has a thickness in the range of 0.05 to 1 mil, and the coating of chrome has a thickness in the range of 0.5 to 1 mil. If an inner coating of dull nickel is used, that coating is approximately 0.5 mils thick.

FIG. 8 illustrates an embodiment of the present invention comprising a soldering tip attached to a temperature-controlled soldering iron with a temperature-sensing element. The soldering iron includes a general body portion 30 with a tip-receiving bore 32. That tip-receiving bore is frusto-conical in shape and is preferably tapered at an angle of approximately 3.0 degrees (plus or minus 0.5 degrees). Within the tip-receiving bore 32 is a sensor element 34 for sensing the temperature of the soldering tip. When the soldering tip 10 is inserted into the bore 32 of the soldering iron 30, the sensor 34 is snugly received by the elongated bore 19. The removeable soldering tip 10 is attached to the tool by pressing the tip into the tip-receiving bore. Because of the mating tapers of the tip and the tip-receiving bore, the manual pressing of the tip into the bore will form a joint between the tip and tool. To remove the tip, a wrench or similar tool engages the two opposed flat surfaces 31 and 33, best shown in FIG. 1, to rotate the tip approximately 5 degrees which will loosen it for its removal.

Thus, it is apparent that the tip can be easily attached and removed from the tool.

Figure 9:
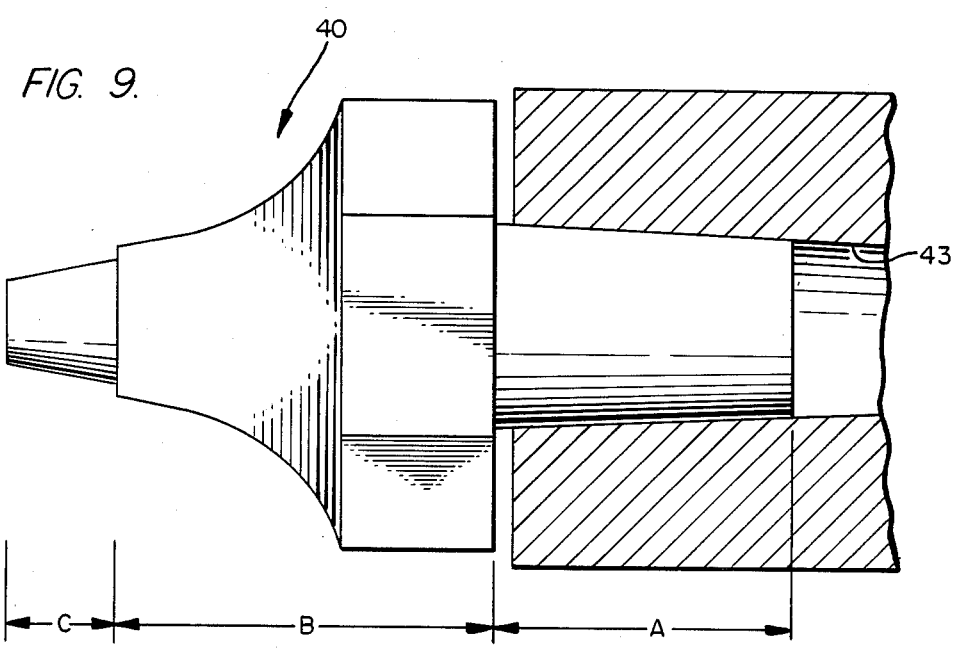
FIG. 9 is a side view of a third embodiment of the invention and shows a de-soldering tip and the tip-receiving bore of a de-soldering tool.
Figure 10:
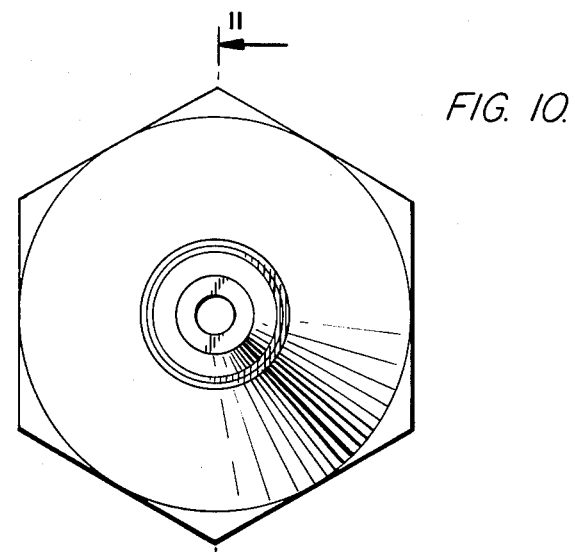
FIG. 10 is a front view of the third embodiment of the invention.
Figure 11:
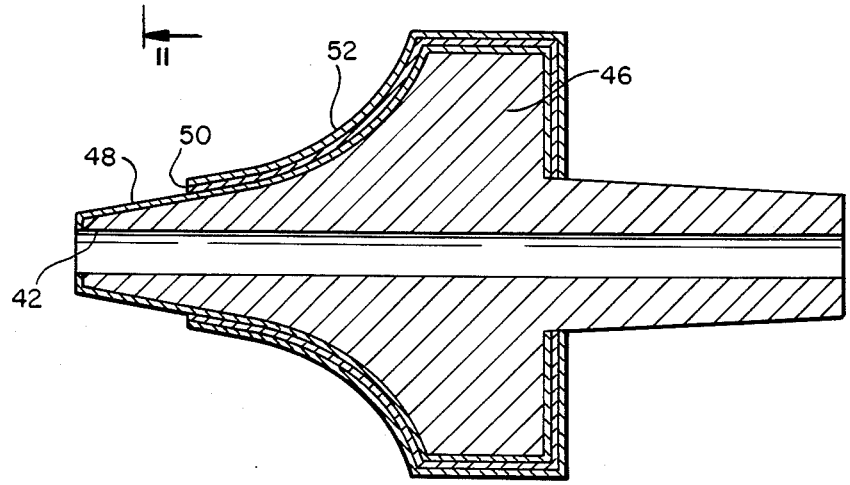
FIG. 11 is a cross-sectional view of the de-soldering tip of the third embodiment of the invention.

FIGS. 9 through 11 illustrate an embodiment of the de-soldering tip 40 and tool made according to the invention. The de-soldering tip 40 includes an attachment portion A, an intermediate portion B adjoining the attachment portion A, and a solder-wetting portion C adjoining the intermediate portion B. The attachment portion A is frusto-conical in shape and has a length and taper similar to that previously described in reference to the tip of a soldering tool. The attachment portion A is sized to fit within a tip-receiving bore 43 of a de-soldering tool. The tip 40 includes a central tubular vacuum passage 42 which aligns with a vacuum tube on the de-soldering tool. The materials for the tip and the geometry of the attachment portion of the tip and its attachment to the de-soldering tool are the same as those previously discussed with respect to the soldering tip. In operation, the tip is heated and then brought into contact with solder which the operator desires to remove from a circuit. A vacuum source is connected to the vacuum passage 42 so that after the solder is melted, the melted solder is drawn off through the tube 42.

The de-soldering tip 40 as shown in FIG. 11 has an integral body 46. The body 46 can be made of conventional materials such as copper, or can be carbon-based. Similarly, the body can be plated with iron, nickel, and chromium platings in a similar manner and for the same purposes as previously discussed regarding the soldering tip. Again, the most preferred embodiment of the de-soldering tip is a carbon-based tip having an uncoated attachment portion. In that preferred de-soldering tip, the wall of tubular vacuum passage 42 is uncoated, bare carbon. The melted solder will not adhere to this carbon and therefore it is unnecessary to plate the passage or place a stainless steel tube in the passage.

The preferred carbon-based soldering and de-soldering tip of the present invention provides several benefits not found in commercial copper soldering and de-soldering tips. First, the carbon body is not prone to oxidation or dissolving. Because of these characteristics, the carbon body will not cavitate or oxidize at points of discontinuity or wear in the metal coatings. The tip of the present invention, therefore, eliminates the problems of pitting, heat transfer loss by oxidation, and freezing by oxidation. The present invention also provides a longer lasting tip at a lower cost. As will be described below, the carbon tip can be coated more quickly than copper, and the porous material of the carbon tip absorbs impurities in the plating baths and results in a more defect-free plating job.

For all types of tips (copper or carbon-based) the self-locking tapered feature of the present invention is less expensive to manufacture and more economical to use since the tips can be easily inserted and removed. It has also been found that the tapered tips transfer heat better than threaded tips and slip fit tips. De-soldering tips made in accordance with the present invention provide a near perfect vacuum seal because the spaces around the tapered sections are small and the taper can be finished very smoothly at a relatively low cost. In addition, tapers are easier to plate smooth.

The presently preferred method of making the soldering and de-soldering tips will now be described. First, a copper or carbon-based tip is machined to the desired shape by a typical machining element such as a lathe or turning machine. It has been found that the preferred carbon materials are easily adaptable to such machining. Due to the production of dust during machining of carbon-based tips, special dust collecting equipment should be used.

In the preferred process, after the tip is formed, the desired coatings are electroplated on the base by a rack or barrel coating process, or a desired combination of both. Both of these coating processes are well-known in the art. The preferred process depends upon the availability of coating machinery, the number of tips to be produced, and the economics of operation.

If the tips are to be coated by a rack coating process, the tips are first electroplated with a coating of iron through the use of a common iron plating bath, such as iron fluoroborate. Next, a coating of nickel is electroplated over the iron coating, and finally a coating of chrome is electroplated over the nickel coating. Plating baths for electroplating nickel and chrome are well-known.

After the chrome electroplating, the nickel and chrome coatings are stripped from the solder-wetting portion of the tip to expose the iron coating as the wetting surface. If desired, the nickel and chrome coatings can also be stripped from the attachment portion of the tip.

It is believed that the barrel coating process may be more economical than a rack coating process, particularly if the tips are produced on a large scale. If tips are to be made by the barrel coating process, it is preferable first to place a thin dull coating of nickel over the base by a rack coating process. This thin coating strengthens the pointed end of the tip so it will not break during the barrel coating process. The remaining steps of electroplating iron, nickel and chrome can be made in a barrel coating process. Then, at least the solder-wetting portion is stripped of any nickel or chrome coatings to expose the iron coating as a wetting surface.

To achieve the present preferred embodiment of the soldering tip shown in FIG. 4, at least two different procedures are possible. First, it is possible to coat the entire length of the tip and then strip any iron, nickel, and chrome coatings from the attachment portion of the soldering tip. In the alternative, the attachment portion can be masked during the electroplating process so that no coating is initially formed on the attachment portion of the tip.

Other embodiments of the invention will be apparent to those skilled in the art in consideration of the specification and practice of the invention disclosed herein. It is intended that the specification and examples be considered as exemplary only, and with a true scope and spirit of the invention being indicated by the following claims.

What is claimed is:

1. A soldering or de-soldering tool having a handle, a heating element, an operating end, and a replaceable soldering or de-soldering tip which has an attachment portion for attachment to the operating end of the tool and a soldering or de-soldering portion, the improvement comprising:

a tapered tip-receiving bore formed in the operating end of the tool for accepting the replaceable tip, and a tapered attachment portion of the tip sized to fit within the tapered tip-receiving bore and securedly fix the tip to the tool by only the manual pressing of the tip into the tip-receiving bore, the attachment portion of the tip (i) having a higher coefficient of heat expansion than that of the material of the tool at the tip-receiving bore and (ii) being rotationally symmetrical so as to allow loosening by rotation of the tip with respect to the tip-receiving bore.

2. The tool of claim 1 wherein the attachment portion of the tip has a length which is equal to at least 10% of the total length of the tip.

3. The tool of claim 2 wherein the tip-receiving bore and the tapered attachment portion of the tip have matching tapers and are both frusto-conical in shape.

4. The tool of claim 3 wherein the tip-receiving bore and the attachment portion are tapered at an angle of approximately 3.0 degrees.

5. The tool of claim 3 wherein the tip-receiving bore and the tapered attachment portion of the tip are tapered at an angle of approximately 3.5 degrees.

6. The tool of claim 1 wherein the tip-receiving bore and the attachment portion are both frusto-conical in shape and the attachment portion of the tip has a length equal to at least 10% of the total length of the tip.

7. The tool of claim 1, wherein the replaceable tip includes means on said tip for accepting a tool to rotate the tip.

8. The tool of claim 7 wherein said tip has an intermediate portion between its attachment portion and its soldering or de-soldering portion wherein said accepting means includes two opposed flat surfaces formed on an intermediate portion of said tip.

9. The tool of claim 1 wherein the tapered attachment portion of the tip is unplated.

10. The tool of claim 1 wherein the attachment portion of the tip is made of a soft material that will upon rotation wear slightly to better conform to the shape of the tip-receiving bore.

11. The tool of claim 1 wherein the replaceable tip has a copper body.

12. The tool of claim 1 wherein the replaceable tip has a body of a carbon-based material.

13. The tool of claim 12 wherein the attachment portion of the tip is not coated so that the body of the carbon-based material will directly interface with the material of the tip-receiving bore.

14. The tool of claim 12 wherein said body of carbon-based material is formed of a material selected from the group consisting of pure carbon, pure graphite, and pyrolytic carbon.

15. The tool of claim 14 wherein said tip has an intermediate portion between its attachment portion and its soldering or de-soldering portion and further comprising a first means coated on at least the soldering or de-soldering portion for providing a wetable working surface, and a second means coated over at least the intermediate portion, but not the soldering or de-soldering portion, for localizing the wetable working surface and impeding the upward flow of solder along the intermediate portion toward the attachment portion.

16. The tool of claim 15 further comprising a tip coating of iron plating formed over only said intermediate portion and said soldering or de-soldering portion,
   a coating of nickel plating formed over said iron coating along only said intermediate portion, and
   a coating a chrome plating formed over said nickel coating along only said intermediate portion.

17. The tool of claim 16 further comprising a tip coating of nickel formed directly on said body of carbon based material along said intermediate portion and said solder-wetting portion, wherein said coating of iron plating is formed on said nickel coating.

18. The tool of claim 12 wherein said tip has an intermediate portion between its attachment portion and its soldering or de-soldering portion and further comprising a coating of iron plating formed over the soldering or de-soldering portion, the intermediate portion and the attachment portion, a coating of nickel plating formed over the iron coating along only the intermediate and attachment portions, and a coating of chrome plating over the nickel coating along only the intermediate and attachment portions.

19. The tool of claim 18 further comprising a tip coating of nickel formed directly on the tip along its entire length wherein said coating of iron plating is formed over said nickel coating.

* * * * *